US012559037B2

(12) United States Patent
Tangitvet

(10) Patent No.: US 12,559,037 B2
(45) Date of Patent: Feb. 24, 2026

(54) VEHICLE SIDE LADDER

(71) Applicant: VANDAPAC CO., LTD., Chonburi (TH)

(72) Inventor: Varawong Tangitvet, Bangkok (TH)

(73) Assignee: VANDAPAC CO., LTD., Chonburi (TH)

( * ) Notice: Subject to any disclaimer, the term of this patent is extended or adjusted under 35 U.S.C. 154(b) by 323 days.

(21) Appl. No.: 18/037,439

(22) PCT Filed: Nov. 18, 2021

(86) PCT No.: PCT/TH2021/000068
§ 371 (c)(1),
(2) Date: May 17, 2023

(87) PCT Pub. No.: WO2022/115048
PCT Pub. Date: Jun. 2, 2022

(65) Prior Publication Data
US 2023/0415655 A1 Dec. 28, 2023

(30) Foreign Application Priority Data
Nov. 27, 2020 (TH) ................................. 2001006761

(51) Int. Cl.
*B60R 3/02* (2006.01)
(52) U.S. Cl.
CPC ............. *B60R 3/02* (2013.01); *B60Y 2200/14* (2013.01)
(58) Field of Classification Search
CPC ...................................................... B60R 3/02
See application file for complete search history.

(56) References Cited

U.S. PATENT DOCUMENTS

| | | | | |
|---|---|---|---|---|
| 6,659,224 B2 * | 12/2003 | Medsker | ................... | B60R 3/02 |
| | | | | 182/127 |
| 7,318,596 B2 * | 1/2008 | Scheuring, III | ........ | B60R 3/002 |
| | | | | 280/166 |
| 7,441,790 B2 * | 10/2008 | Lechkun | ................... | B60R 3/02 |
| | | | | 280/166 |

(Continued)

FOREIGN PATENT DOCUMENTS

| | | | | | |
|---|---|---|---|---|---|
| CN | 201099208 Y | * | 8/2008 | ............... | B60R 3/02 |
| CN | 101396990 A | | 4/2009 | | |

(Continued)

OTHER PUBLICATIONS

ISR for International Application No. PCT/TH2021/000068 mailed Apr. 6, 2022.

(Continued)

*Primary Examiner* — Emma K Frick
(74) *Attorney, Agent, or Firm* — LADAS & PARRY LLP

(57) ABSTRACT

The vehicle side step (200) is installed to the automobile with the vehicle side step (200), which is used for supporting the stepping into the automobile (100) in order to go in and out of the passenger cabin, wherein the vehicle side step (200) can be folded up and down, whereby the supporting beam (202) can be folded snugly against the side of the automobile body in order to avoid impact from uneven surfaces and pavements, or as the supporting beam (202) is folded down, which is used for stepping down from the passenger cabin comfortably.

11 Claims, 13 Drawing Sheets

(56) References Cited

U.S. PATENT DOCUMENTS

| | | | | |
|---|---|---|---|---|
| 7,744,106 | B2 * | 6/2010 | VanBelle | ................. B60R 3/02 280/166 |
| 8,042,821 | B2 * | 10/2011 | Yang | ........................ B60R 3/02 280/166 |
| 8,469,380 | B2 * | 6/2013 | Yang | ........................ B60R 3/02 182/127 |
| 11,897,423 | B2 * | 2/2024 | Kipley | ................... B60R 3/002 |
| 2003/0132595 | A1 | 7/2003 | Fabiano et al. | |

FOREIGN PATENT DOCUMENTS

| | | | |
|---|---|---|---|
| CN | 101462517 A | 6/2009 |
| CN | 103786652 A | 5/2014 |
| CN | 105438079 A | 3/2016 |
| JP | 2019014406 A | 1/2019 |

OTHER PUBLICATIONS

Written Opinion for International Application No. PCT/TH2021/000068 mailed Apr. 6, 2022.

* cited by examiner

VEHICLE SIDE LADDER

CROSS REFERENCE TO RELATED APPLICATIONS

This application is a U.S. National Stage Application under 35 U.S.C. § 371 of International Application No. PCT/TH2021/000068 which was filed on 18 Nov. 2021, which claims priority from TH Application No. 2001006761 filed 27 Nov. 2020 the disclosures of which are incorporated in their entirety by reference herein.

BACKGROUND OF THE INVENTION

Since some pick-up truck type automobiles are very high, it is a problem for users who gets in and out from the passenger cabin, and they are also used for heavy duty tasks or off-road tasks, whereby they are used for travelling on bumpy and rough surfaces. For this reason, there is a risk of impact to the automobile undercarriage or along the side of the passenger cabin door from debris or uneven surfaces, which causes damage to the automobile. Therefore, the present invention will solve this problem.

The function of conventional vehicle side step is as a support for stepping up and down when getting into the passenger cabin, which is attached to the undercarriage at the side of the passenger cabin door and is lower than the door and protrudes from the side of the automobile to support the user's steps, wherein the attachment is fixed and cannot be moved or folded. This kind of attachment, when used for stepping in and out when the automobile travels around, since it is low and protrudes from the automobile body, will impact uneven surfaces and the pavement, causing damage. If it is foldable, it will be implemented by an electrical system or have many complex parts. Furthermore, an alternative kind of conventional vehicle side step, is used as a fender to prevent impact and debris from hitting it, and is attached to the undercarriage at the side of the passenger cabin. This vehicle side step is attached as a fender to the lower edge of the door, which makes this usage a one-way operation. Therefore, the efficiency is not maximized.

SUMMARY OF THE INVENTION

The vehicle side step attached to the automobile with the vehicle side step is used for stepping in and out of the passenger cabin, and can be folded up and down, whereby the support beam can be folded snugly against the side of the automobile body in order to avoid impact from uneven surfaces and pavements, or the support beam used for stepping down from the passenger cabin comfortably.

One objective of the present invention is to enable it to be attached to various types of automobiles.

Another objective of the present invention is to enable the vehicle side step to be folded up and down from the automobile securely.

DETAILED DESCRIPTION

Figure 1:
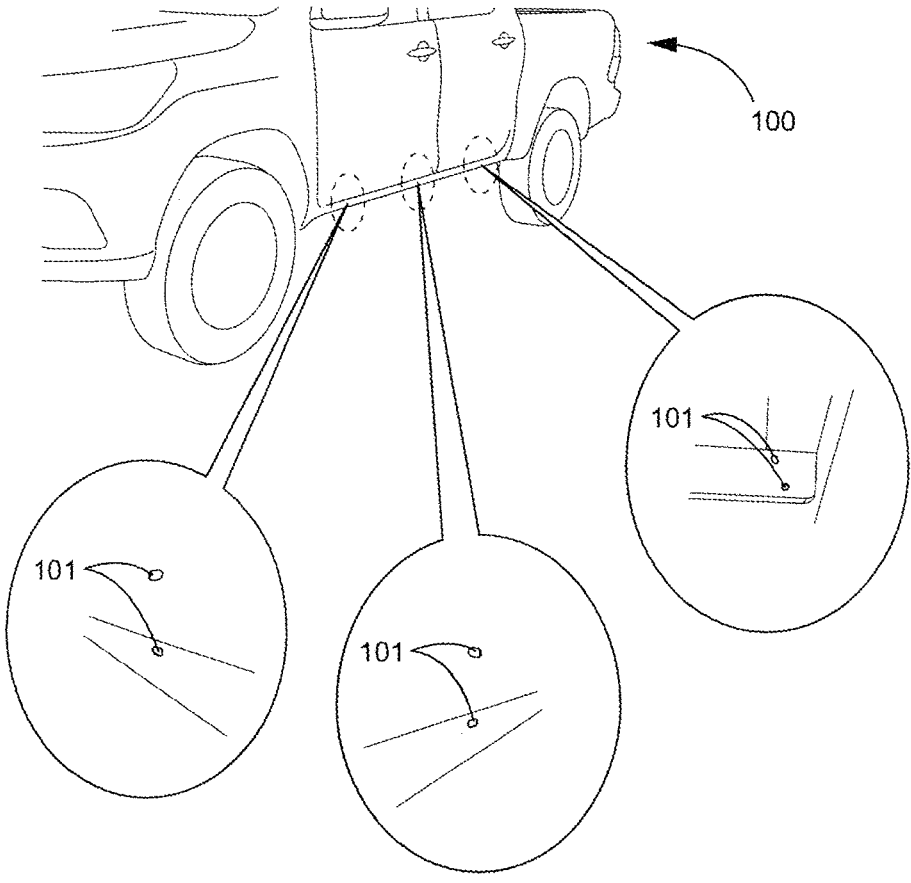
FIG. 1 shows the fixing positions of the automobile

FIG. 1 shows the attachment position of 100 which is installed with 200 so that it can be attached to 100, whereby the area under the side of the passenger cabin has a long iron panel all the way along and a plurality of holes 101 at different points with intervals between them, whereby different automobiles have different amounts of holes. 101, but some holes 101 have consistent positions and intervals, which are used for attaching the vehicle side step 200, whereby there are three sets of holes 101 that are spaced at intervals, and have different attachment characteristics. The present invention will enable the 200 to be attached to different versions of the 100 and attached securely.

Figure 2:
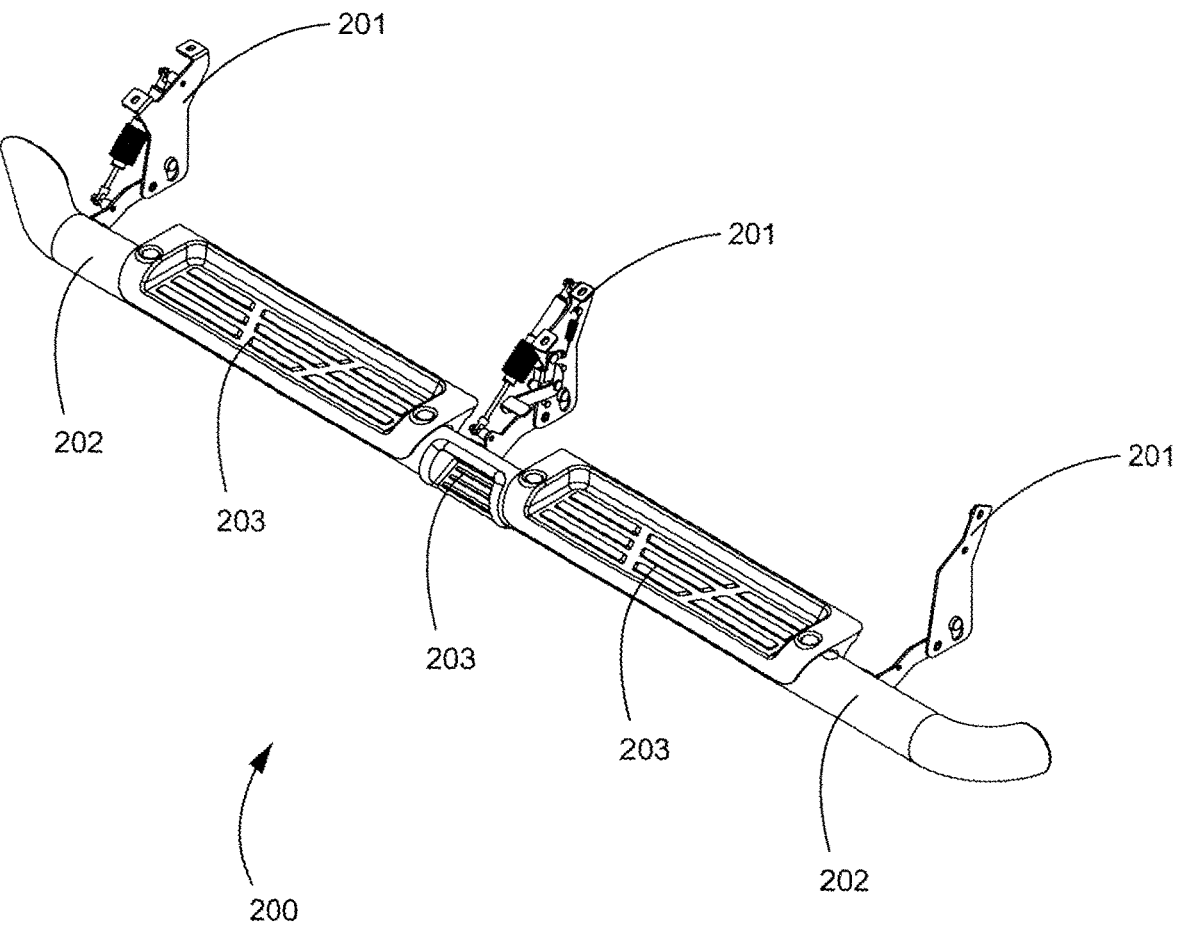
FIG. 2 shows the features and components of vehicle side step
Figure 3:
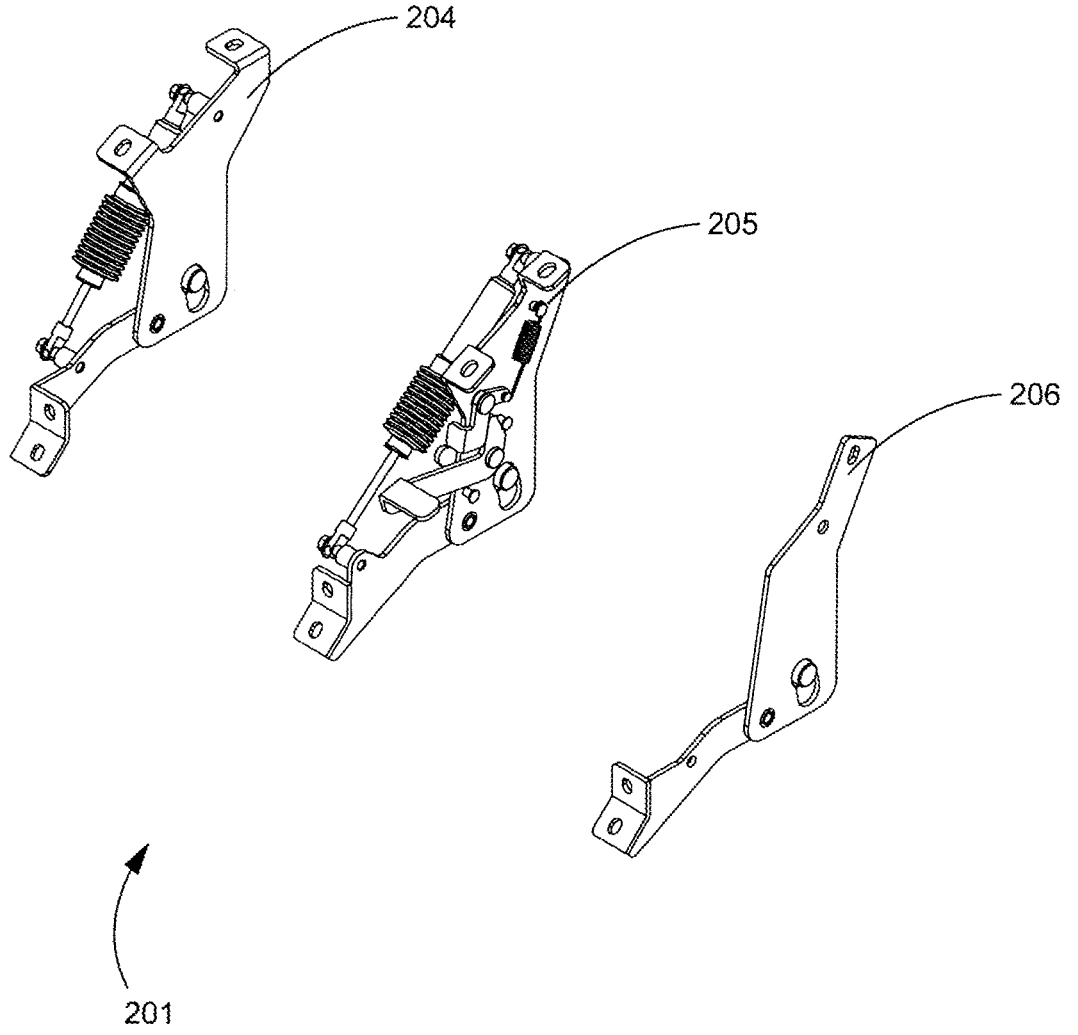
FIG. 3 shows the features and components of the fixing device set

FIG. 2 shows features and components of the vehicle side step 200, which is attached to the automobile 100, wherein the vehicle side step 200 is used as a step up into the automobile 100 for getting in and out of the passenger cabin, wherein each type of automobile 100 has different types of undercarriage areas. However, some positions have similar attachment intervals and characteristics, and these positions are the areas that are attached to the vehicle side step 200, and the vehicle side step 200 can be folded up and down, which has characteristics of the stepping beam folded snugly against the side of the automobile body in order to avoid impact from uneven surfaces and pavements or the stepping beam which can be folded down for stepping down from the passenger cabin comfortably, wherein the vehicle side step 200 comprises the fixing device set 201, the support beam 202 and the stepping panel 203.

FIG. 3 to FIG. 7 show the features and components of the fixing device set 201, which is used for fixing the support beam 202 and the stepping panel 203 to the automobile 100, wherein the fixing device set 201 is the part that enables the support beam 202 to be folded snugly against the side of the automobile 100. In this way, the support beam 202 and the stepping panel 202, which protrude at a low height from the car body, avoid being impacted by uneven surfaces and pavements, which can cause damage. The fixing device set 201 is comprised of the first fixing device 204, the second fixing device 205, and the third fixing device 206.

Figure 4:
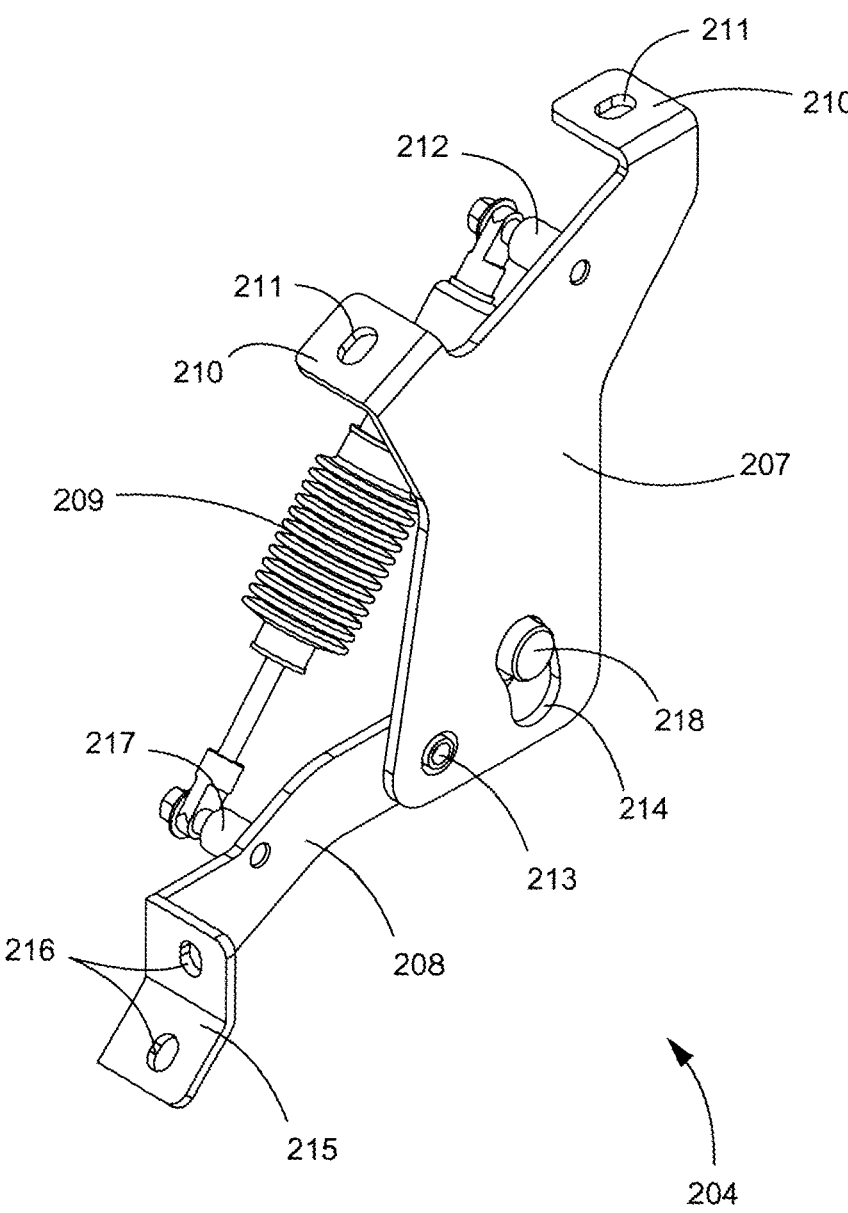
FIG. 4 shows the features of the first fixing device

FIG. 4 shows the features of the first fixing device 204, which is a solid uniform panel made from polymer, plastic, or metal materials such as iron or alloys molded by any methods suitable for molding that material. The first fixing device 204 is used as the pulling part of the support beam 202 to lift it up snugly against the side of the automobile 100. The first fixing device 204 is comprised of the automobile fixing panel 207, the support beam fixing panel 208, and the shock absorber 209.

The automobile fixing panel 207 is a panel which has a supporting part for fixing it to the support beam fixing panel 208 in order to enable the support beam 202 to be attached to the automobile 100, whereby the automobile fixing panel 207 has one edge as a part fixed to the automobile 100. The area of the edge has a fixing panel 210 which covers the hole 101 of the automobile 100 and the fixing panel 210 which has the hole 211 used for being inserted with a screw and nut for attaching it to the hole 101 of the automobile 100 securely, and one part of the surface of the automobile fixing panel 207, which is an extended part 212 that is somewhat higher than the surface and is used as a part that is attached to one end of the shock absorber 209, wherein the shock absorber 209 has another end attached to the support beam fixing panel 208 respectively, and the automobile fixing panel 207 has another part of the area that is the place that the support beam fixing panel 208 is attached to, wherein the support beam fixing panel 208 has another end covered and attached to the automobile fixing panel 207, with the rivet 213 that is a rotating point that enables the support beam fixing panel 208 to be attached to the automobile panel 207 in way that can rotate, next to the rivet 213 that fixes one part of the support beam fixing panel 208, wherein the end of the support beam fixing panel 208 that engages on the groove 214. The groove 214 of the automobile fixing panel 207 is the groove 214 with a certain length that bends according to the radius of rotation of the support beam fixing panel 208 in order to indicate the position of rotation in the determined degree which enables the support beam fixing panel 208 to be folded up and down against the automobile fixing panel 207 securely.

The support beam fixing panel 208 is a panel used to attach to the support beam 202 by the support beam 208. It has one end attached to the support beam 202, and the end area has the fixing panel 215 which covers the support beam 202, and at the fixing panel 215 there is the hole 216 used for being inserted with a screw and nut that is attached to the support beam 202 securely and the support beam fixing panel 208 has one part of the area that is the fixing part 217, which has a certain height above the surface It is used as a part that is attached to one end of the shock absorber, wherein the shock absorber 209 has another end attached to the automobile fixing panel 207 respectively, and the support beam fixing panel 208 has another end that covers the automobile fixing panel 207, which has the rivet 213 that fixes the support beam fixing panel 208 to the automobile fixing panel 207. This kind of fixing enables the support beam fixing panel 208 to be fixed to the automobile fixing panel 207 pivotally, and then to the end of the support beam fixing panel 208, which is the spur 218 that inserts into the groove 214 of automobile fixing panel 207, which enables the spur 218 of the support beam fixing panel 208 to hook into the groove 214, and wherein the groove 214 has a length of a certain radius length enabling supporting the beam fixing panel 208 to swing pivotally back and forth according to the length of the groove 214.

The shock absorber 209 is a cylinder shape that uses a spring, vacuum, or electricity that has pulling force to pull one end of the support beam fixing panel 208 so that it can be rotated and folded up to the automobile fixing panel 207, wherein one end of the shock absorber 209 is attached to the automobile fixing panel 207 and the other end of the shock absorber 209 is attached to the support beam fixing panel 208.

Figure 5:
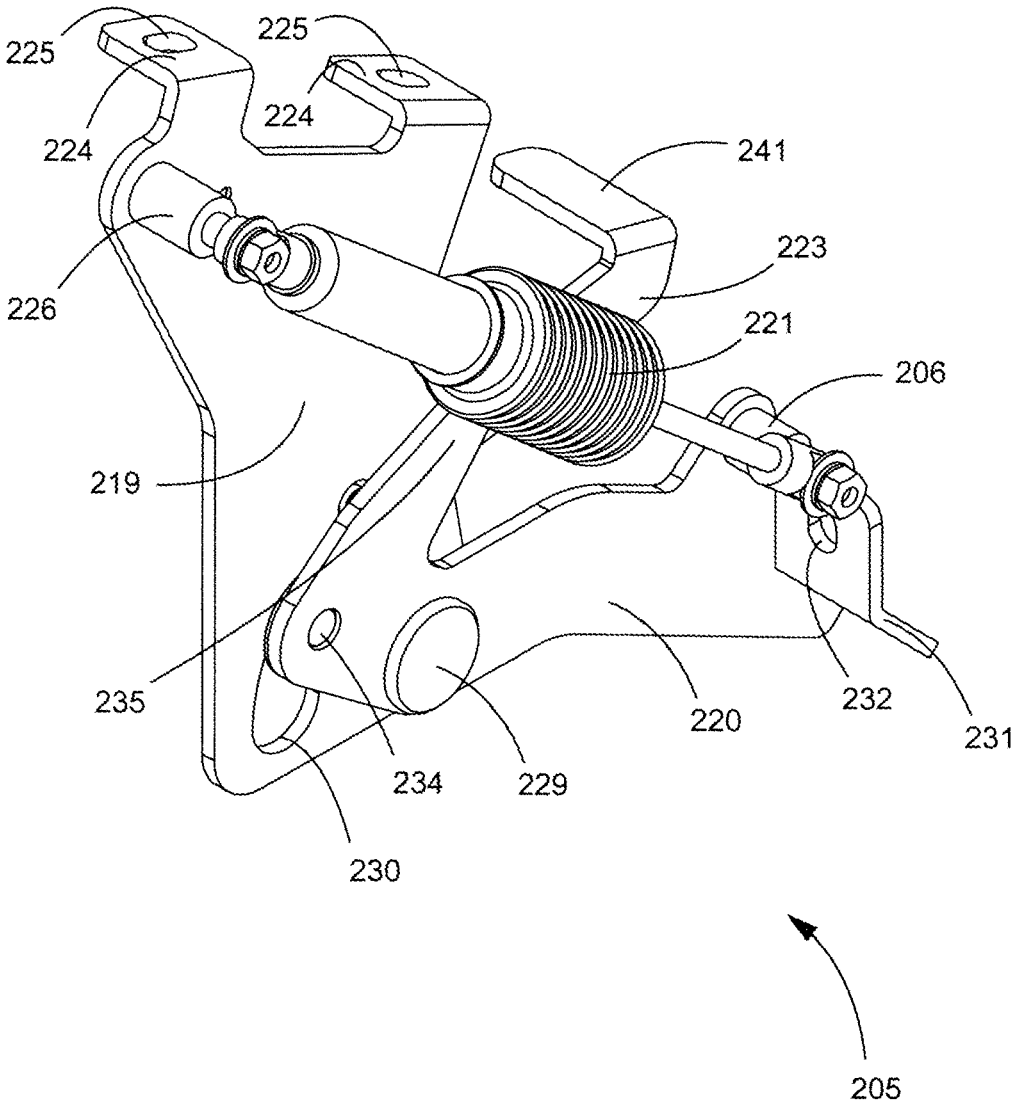
FIG. 5 shows the features the second fixing device
Figure 6:
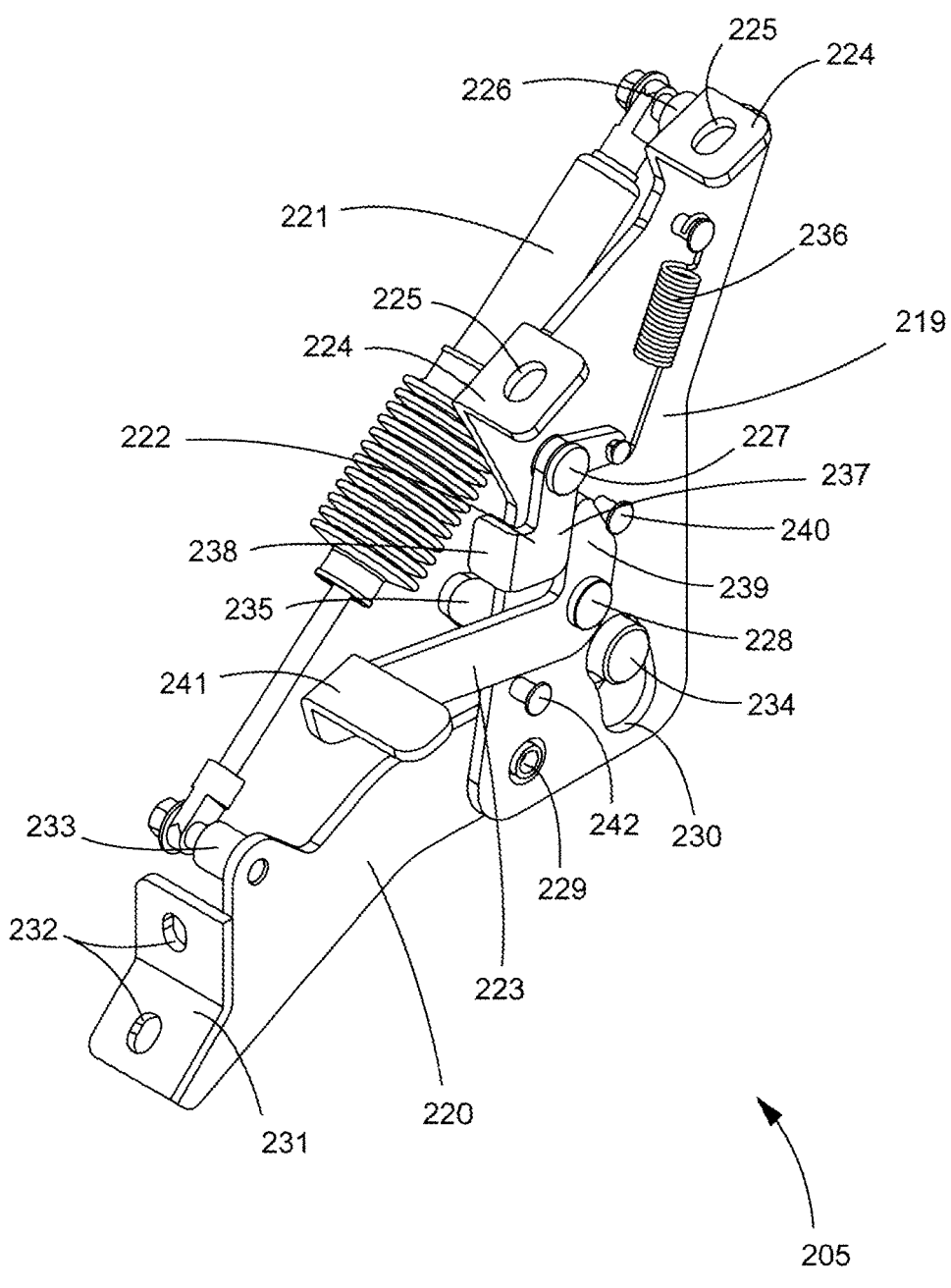
FIG. 6 shows the features the second fixing device from another view
FIG. 7 show the features the third fixing device
FIG. 8 show the features of the support beam

FIG. 5 and FIG. 6 show features of the second fixing device 205, which is a solid uniform panel made of polymer, plastic or metal materials, such as iron or alloy, made by any suitable molding method. The second fixing device 205 is used as a pulling part of the support beam 202 enabling it to be lifted snugly to the side of the automobile 100 and is also a locking part which enables the support beam 202 to be folded up and down controlled by the user. The second fixing device 205 is comprised of the automobile fixing panel 219, the support beam fixing panel 220, the shock absorber 221, the locking panel 222, and the locking control panel 223.

The automobile fixing panel 219 has a supporting attachment part to support the beam 220, the locking panel 222, and the locking control panel 223, whereby the automobile fixing panel 219 has one edge attached to the automobile 100 wherein the edge area has the fixing panel 224, which covers the hole 101 of the automobile 100, and the fixing panel 224 has the hole 225, which is used for being inserted with a screw and knot that is tightened into the hole 101 of the automobile 100 securely and the automobile fixing panel 219 has one surface that is the fixing part 226, which has a certain height about the surface, which is used as a part to attach to one end of the shock absorber 221, wherein the shock absorber 221 has one end attached to the support beam fixing panel 220 respectively, and the automobile fixing panel 219 has one area for attaching to the locking panel 222 and the locking control panel 223, which are attached adjacently. The locking panel 222 is attached to the automobile fixing panel 219 by having a first rivet 227 as a fulcrum, enabling the locking panel 222 to be attached to the automobile fixing panel 219 pivotally, and adjacently there is also a second rivet 228 as a fulcrum point that enables the locking control panel 223 to be attached to the automobile fixing panel 219 pivotally respectively, and then is the part that is attached to the support beam fixing panel 220, wherein the support beam fixing panel 220 has one end that covers and attaches to the automobile fixing panel 219 by having a third rivet 229 as a fulcrum that enables the support beam fixing panel 220 to be attached to the automobile fixing panel 219 pivotally next to the third rivet 229 that fixes one part of the support beam fixing panel 220, whereby one end of the support beam fixing panel 220 is engaged to the groove 230, wherein the groove 230 of the automobile fixing panel 219 is the groove 230 with a certain length bending according to the radius of rotation of the support beam fixing panel 220 in order to indicate the position of rotation in a determined degree which enables the support beam fixing panel 220 to be folded up and down to the automobile fixing panel 219 securely.

The support beam fixing panel 220 is a panel that is used to attach to the support beam 202 wherein the support beam fixing panel 220 has one end as an attachment to the support beam 202, whereby the end area has the fixing panel 231 that covers the support beam 202 and at the fixing panel 231 there is the hole 232 used for inserting a screw and knot tightened to the support beam 202 securely and the support beam fixing panel 220 has one part as the fixing part 233, with a certain height above the surface. This is used as an attaching part to one end of the shock absorber 221, wherein the shock absorber 221 has another end that is attached to the fixing panel 219 respectively and the support beam fixing panel 220 has another end that covers the automobile fixing panel 219, which has the third rivet 229 that fixes the support beam fixing panel 220 to the automobile fixing panel 219. This fixing will enable the support beam fixing panel 220 to attach to the automobile fixing panel 219 pivotally and next to one end of the support beam fixing panel 220 is a pin 234 inserted into the groove 230 of the automobile fixing panel 219. This will enable the spur 243 of the support beam fixing panel 220 to engage to the groove 230 and the groove 230 has the certain length of radius which will make the support beam fixing panel 220 rotate back and forth according to the length of the groove 230 and the furthest end. It is a curved panel as the supporting part 235 which supports the locking panel 222 to prevent the end of the support beam fixing panel 220 that is attached to the support beam 202 from the pulling of the shock absorber 221 in order to lock the folding up and down position of the support beam fixing panel 220 so that it remains in a secure and workable position.

The shock absorber 221 is a cylindrical shape which uses a spring, vacuum or electricity that has pulling force for pulling one end of the support beam fixing panel 220 so that it rotates upwards and folds into the automobile fixing panel 219, wherein one end of the shock absorber 221 is attached to the automobile fixing panel 219 and another end of the shock absorber 221 attached to the support beam fixing panel 220.

The locking panel 222 is a bent panel used to cross engage with the supporting part 235 of the support beam fixing panel 220 in order to lock the end position of the support beam fixing panel 220, which is attached to the support beam 202, so that the support beam 202 is not lifted from the shock absorber 221's pulling in order to lock the position of folding up and down of the support beam fixing panel 220, so that it is in the working position. The locking panel 222 is attached to the automobile fixing panel 219 by the rivet 227 at the locking panel 222 pivotally in order to unlock the support beam fixing panel 220 according to the pulling force of the shock absorber 221, so that it can swing up, whereby one end of the locking panel 222 is hooked to the spring 236 wherein the spring 236 is attached to the automobile fixing panel 219, enabling the locking panel 222, which has one end pulled by the spring 236 so that it rotates to the original position. Next, at another end there is the first supporting part 237, which supports the locking control panel 223, enabling the locking panel 222, which has one end pulled by spring 236 and does not rotate according to the pulling force of spring 236, in order to enable the locking panel 222 to remain in a constant position, which will receive the pushing force of the locking control panel 223, which enables the locking panel 222 to swing in order to unlock the support beam fixing panel 220 in order to make the support beam fixing panel 220 swing up and fold to the automobile fixing panel 219, and next, at the furthest end of the locking panel 222, the second supporting part area 238, which is supported by the supporting part 235 of the support beam fixing panel 220, enabling the locking panel 222, which has one end pulled by the spring 236 in order to resist the pushing force of the supporting part 235, and remain in a secure position, whereby the second support part area 238 protrudes outwards a lot and is cross engaged with the supporting part 235 of the support beam fixing panel 220, enabling the support beam fixing panel 220 to be locked into a stationary position that cannot be moved upwards according to the pulling force of the shock absorber 221, which swings towards the automobile fixing panel 219, enabling the support beam fixing panel 220 to remain open in a stationary position.

The locking control panel 223 is a panel that covers the automobile fixing panel 219, which has the third rivet 229 that fixes the locking control panel 223 to the automobile fixing panel 219 pivotally, whereby one end of the locking control panel 223 has the supporting part 239, which bends to support the first supporting part 237 of the locking panel 222, enabling the locking panel 222 to remain stationary, so that it does not swing according to the pulling force of the spring 236, whereby the supporting part 239 has the first position indicated point 240, protruding outwards from the surface of the automobile fixing panel 219, which is cross engaged with the supporting part 239, so that the pulling force of the spring 236 at the locking panel 222 at the spring 236 does not swing backwards, and the locking control panel 223 has another end, which has the supporting part 241 as an area for receiving force from being pressed or stepped on, in order to control the unlocking of the support beam fixing panel 220, so that it swings upwards, whereby the supporting part 241 has a certain length protruding outwards, so that it is convenient for being pressed or stepped on by foot, or pressed by hand. When it is pushed down a certain distance, there will be the second position indicated point 242, which is the supporting part, so that the locking control panel 223 does not swing over the threshold that enables the supporting part 239 to rotate and fall out from the first supporting part 237 of the locking panel 222, enabling the vehicle side step 200 to be folded up and down to the side of the automobile 100 securely.

Figure 7:
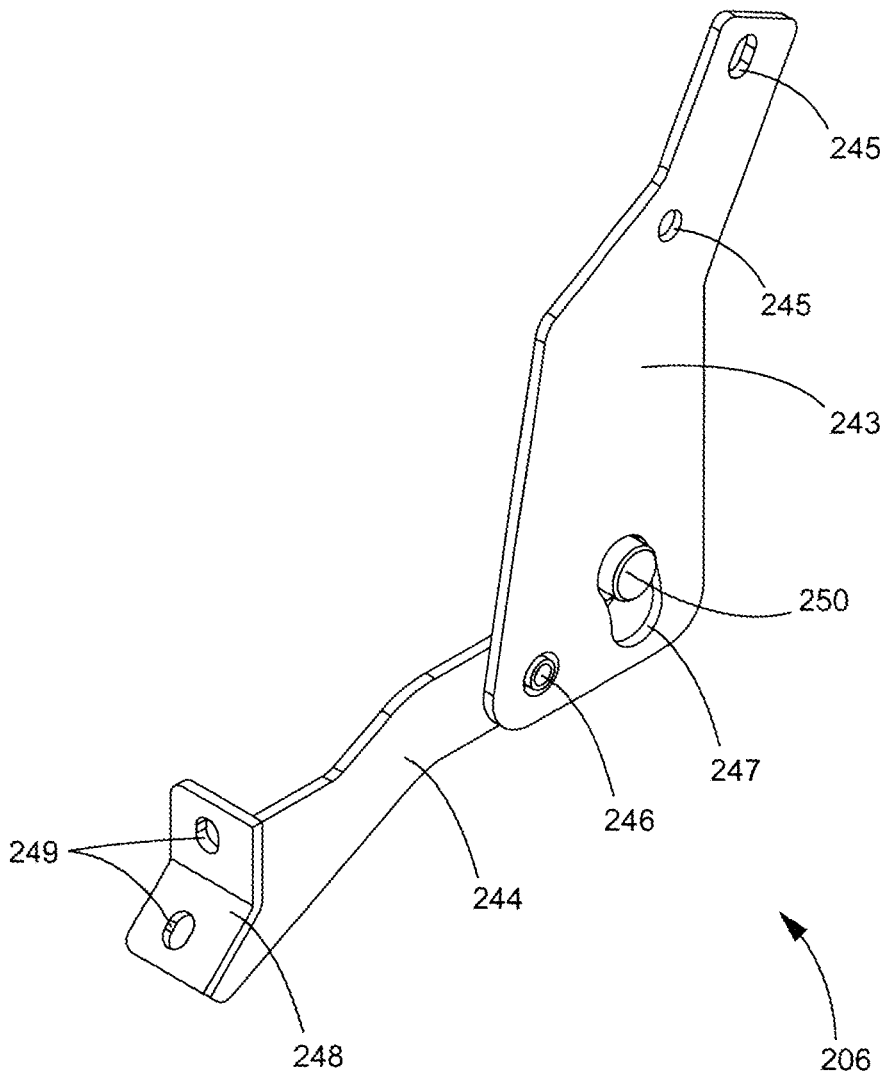

FIG. 7 shows the features of the third fixing device 206, which is a panel that has a solid uniformity made of polymer, plastic or metal such as iron or alloy by molding by any method suitable for molding that material, wherein the third fixing device 206 is used as a part for receiving force or weight of the user that transfers down to the support beam 202, whereby the third fixing device 206 does not have pulling force from the shock absorber. The third fixing device 206 is comprised of the automobile fixing panel 243 and the support beam fixing panel 244.

The automobile fixing panel 243 is a panel which has a supporting part attached to the support beam fixing panel 244, enabling the support beam 202 attached to the automobile 100, whereby the automobile fixing panel 243 has one edge as a fixing part to the automobile 100, wherein the edge area has the hole 245 used for inserting with a screw and nut that is tightened to the hole 101 of the automobile 100 securely, and the automobile fixing panel 243 has another surface area as an attachment to the support beam fixing panel 244, wherein the support beam fixing panel 244 has one end that covers and is attached to the automobile fixing panel 243 by having the rivet 246 as a fulcrum, enabling the support beam fixing panel 244 attached to the automobile fixing panel 243 pivotally, and next to the rivet 246, which fixes one part of the support beam fixing panel 244 wherein one end of the support beam fixing panel 244 is engaged with the groove 247. The groove 247 of the automobile fixing panel 243 is the groove 247 which has a certain length that bends according to the radius of rotation of the support beam fixing panel 244 in order to be the rotation position in the determined degree, enabling the support beam fixing panel 244 to be lifted and folded up and down securely to the automobile fixing panel 243.

The support beam fixing panel 244 is a beam that is attached to the support beam 202, whereby the support beam fixing panel 244 has one end as an attachment to the support beam 202, wherein the area on the end of the fixing panel 248 covers the support beam 202 and at the fixing panel 248 there is a hole 249 for inserting with a screw and nut which is tightened to the support beam 202 securely, and the support beam fixing panel 244 has another end that covers the automobile fixing panel 243, which has the rivet 246 that fixes the support beam fixing panel 244 to the automobile fixing panel 243. With this fixing enabling the support beam fixing panel 244 to be attached to the automobile fixing panel 243 pivotally, and then at one end of the support beam fixing panel 244 is a spur 250, which is inserted into the groove 247 of the automobile fixing panel 243, enabling the spur 250 of the support beam fixing panel 244 to engage to the groove 247 and wherein the groove 247 has a certain radius length that enables the support beam fixing panel 244 to swing back and forth according to the length of the groove 247.

Figure 8:
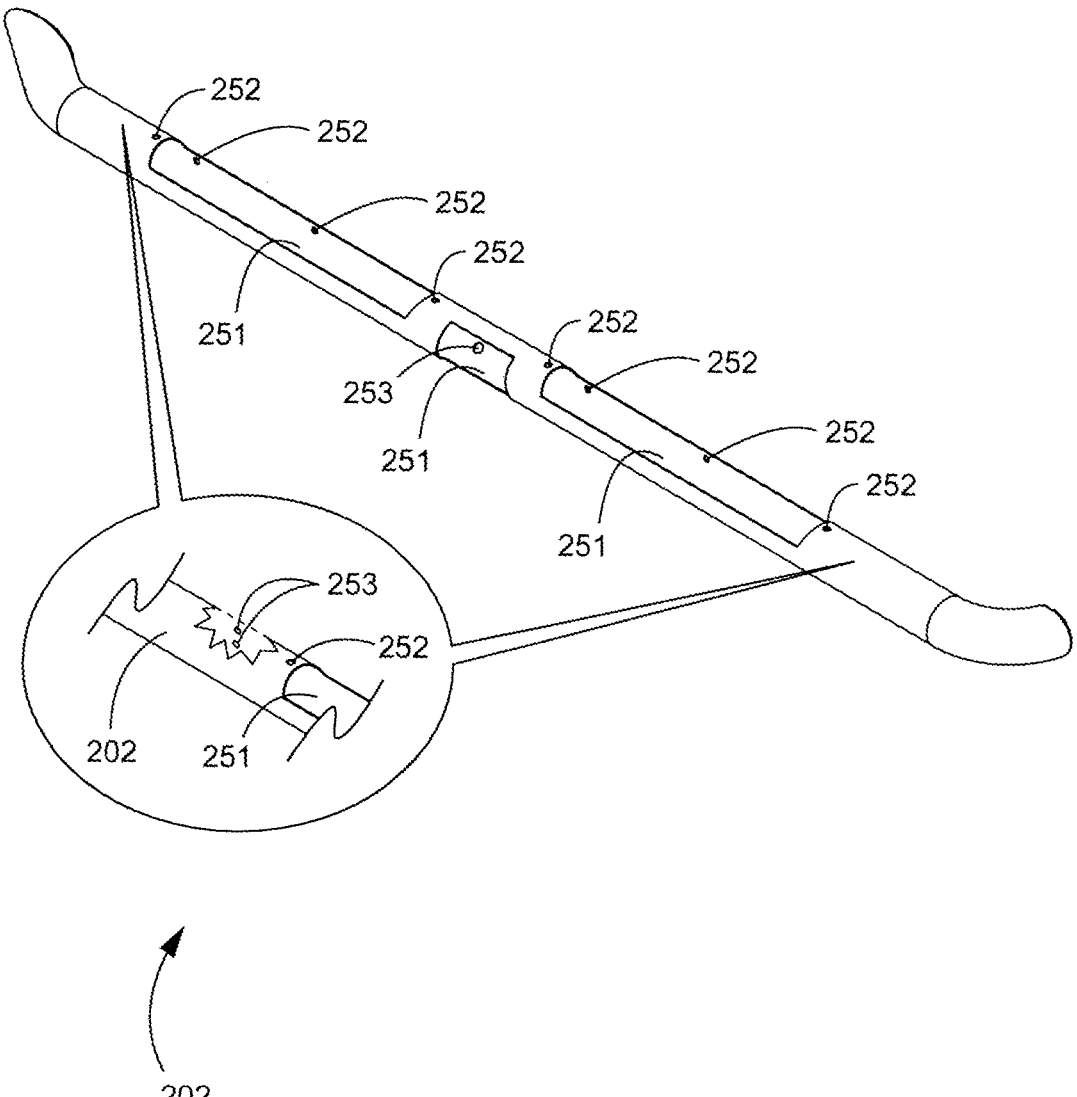

FIG. 8 shows the support beam 202 which is a section that is disposed longitudinally of the automobile 100, used as a beam that is attached to the fixing device set 201 which is fixed to the automobile 100, wherein the support beam 202 has the upper part and front part as the support attachment to the stepping panel 203, whereby the upper surface and front has a concave part 251, which is used for supporting the insertion of the stepping panel 203 and at the edge of concave part 251 there is the hole 242, which is used for inserting with nuts and screws that are tightened to the stepping panel 203 and the rear area of the support beam 202, facing the automobile 100 with the hole 253 lined up in sets, which are inserted by screws and nuts that are tightened to the fixing device set 201, enabling the support beam 202 to be fixed to the automobile 100 securely.

Figure 9:
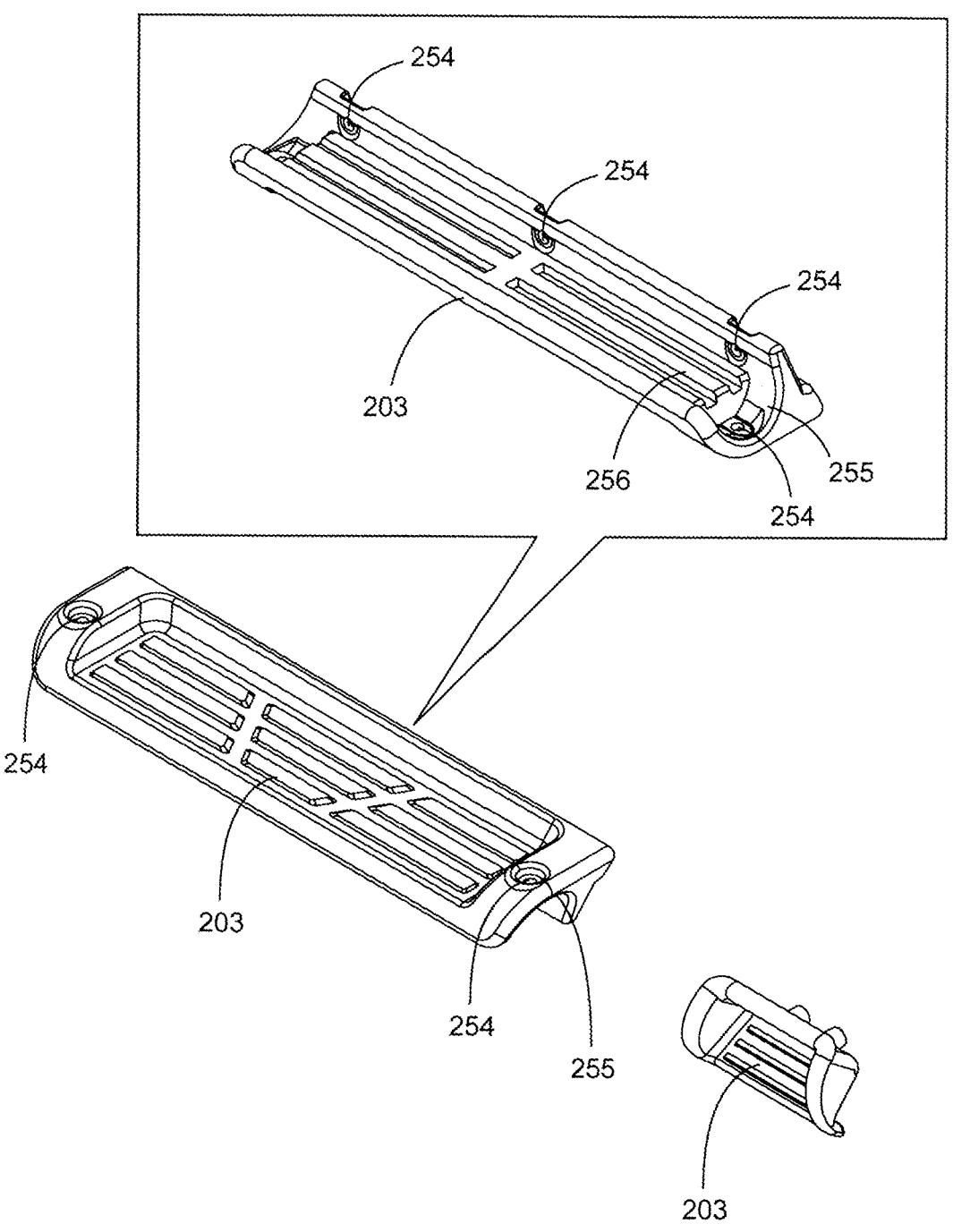
FIG. 9 shows the features of the stepping panel

FIG. 9 shows the features of the stepping panel 203, which is a panel that is a sheet to cover and attach to concave part 251 of the support beam 202, wherein the stepping panel 203 is used to support stepping up to the automobile 100, and receiving force from pressing the support beam 202 when it is folded up in order to be folded down for use, wherein the stepping panel 203 has more than one panel that is attached to the support beam 202 that is lined up at intervals, whereby the stepping panel 203 has a light weight and determines the position of stepping up into the automobile 100 for increased ease of stepping in and out of the automobile 100, whereby the stepping panel 203 has a flat front surface, enabling it to support the sole of the foot completely and this area also has a surface that is a small groove in order to prevent slipping, or to remove debris from the feet before getting into the passenger cabin, and the stepping panel 203 has a front and back surface with the hole 245, which is used for inserting with a screw and nut tightened to the support beam 202, and another surface which is the back is a cover and attachment to the support beam 202, wherein the stepping panel 203 has the groove 255, wherein the size of the groove 255 is approximately equal to the support beam 202, enabling the stepping panel 203 to cover the support beam 202 securely, and at the groove 255 there is the protruding part 256 used for inserting and attaching to concave part 251 of the support beam 202 in order to lock the stepping panel 203 to be attached to the support beam 202 securely.

Figure 10:
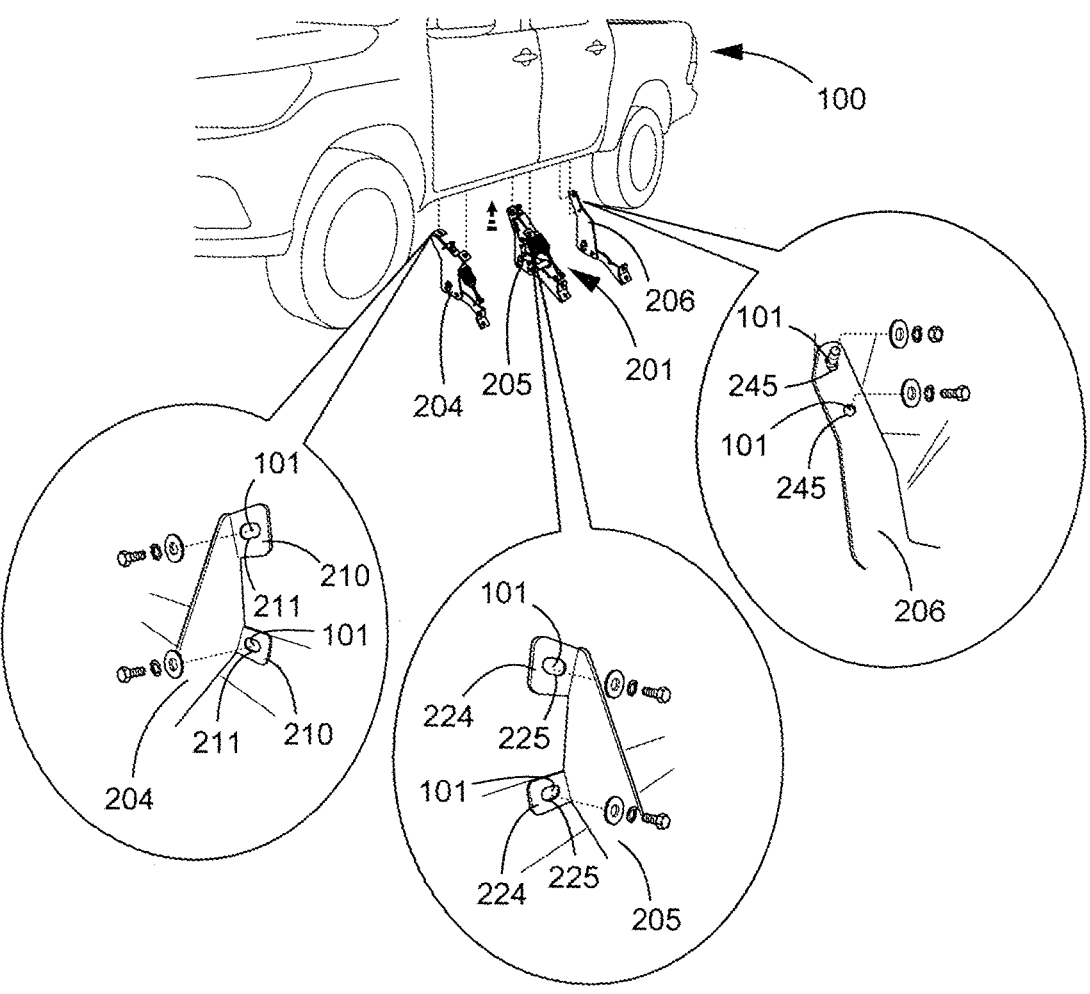
FIG. 10 shows the features of the fixing characteristics of the fixing device set attached to the automobile

FIG. 10 shows the fixing feature of the fixing device set 201 attached to the automobile 100, enabling the vehicle side step 200 to be attached to the side area of the automobile 100, whereby the side area of the automobile 100, whereby the area under the cabin has hole 101, which is used to attach to the fixing device set 201, whereby the first fixing device 204 has one end that has the fixing panel 210 as a cover and has the hole 211 tightened by screws and nuts tightened to the hole 101 of the automobile 100, and has the second fixing device 205, which has one end that has the fixing panel 224 as a cover and has the hole 225 tightened by screws and nuts tightened to the hole 101 of the automobile 100, and the third fixing device 206 at one end covers the iron beam, wherein the third fixing device 206 has the hole 245 tightened by screws and nuts tightened to the hole 101 of the automobile 100, enabling the fixing device set 201 that has the first fixing device 204. The second fixing device 205, and the third fixing device 206 are attached to the automobile 100, which are lined up at intervals, enabling the fixing device set 201 to be attached to the automobile 100 securely, and support the weight transferred from the support beam 202 greatly.

Figure 11:
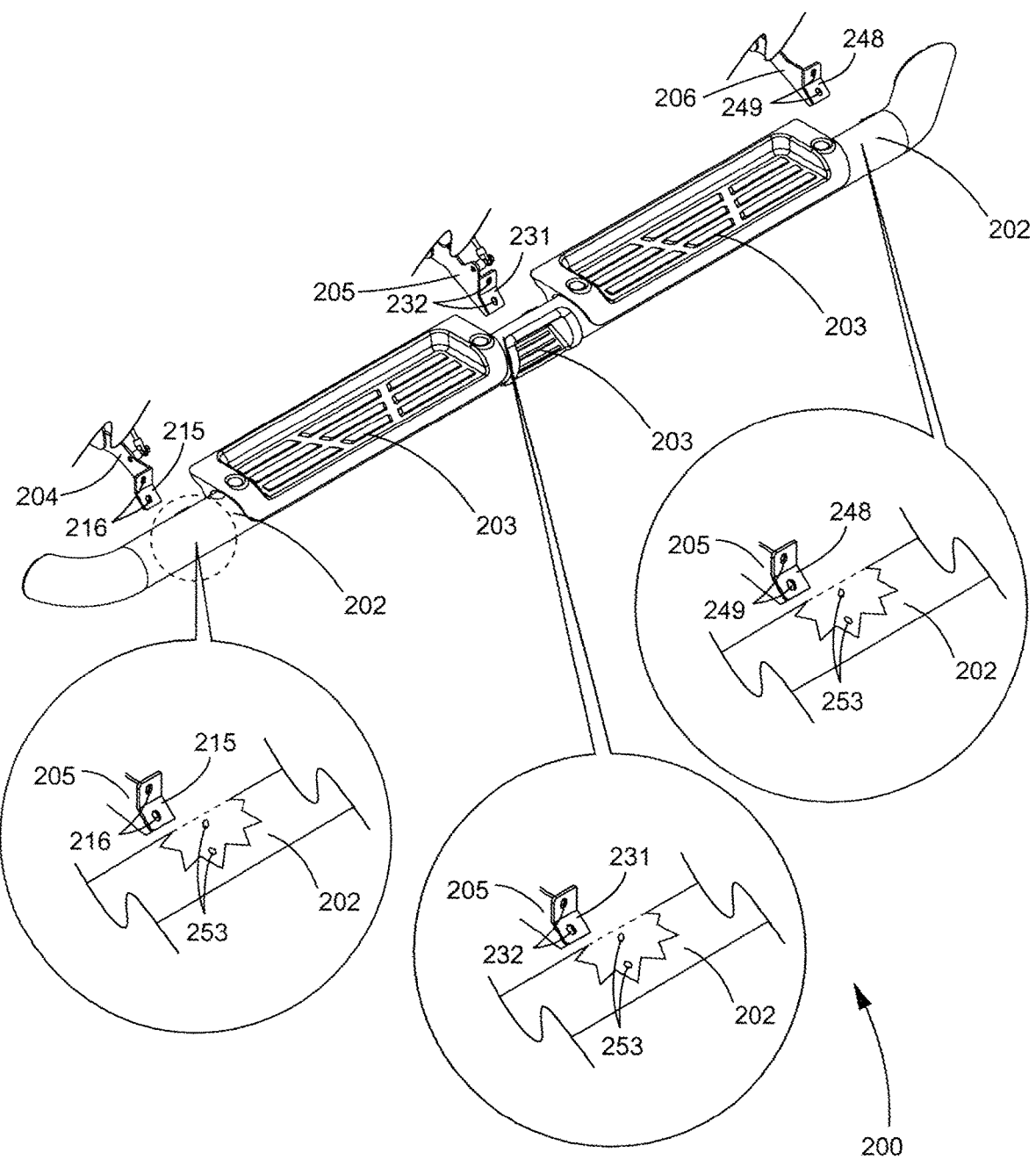
FIG. 11 shows the features of the fixing characteristics of the fixing device set attached to the support beam
FIG. 12 show the characteristics of the second fixing device operation

FIG. 11 shows the fixing features of the fixing device 201 attached to the support beam 202 wherein the first fixing device 204, the second fixing device 205, and the third fixing device 206 have one end that has the fixing device 215, 231, 248 respectively, which cover the hole 253 lined up as a set at the back area of the support beam 202, wherein the first fixing device 204, the second fixing device 205, and the third fixing device 206 have the holes 211, 232, 249 respectively. These are tightened with screws and nuts to the hole 253 of the support beam 202, enabling the vehicle side step 200 to be attached to the automobile 100 securely.

Figure 12:
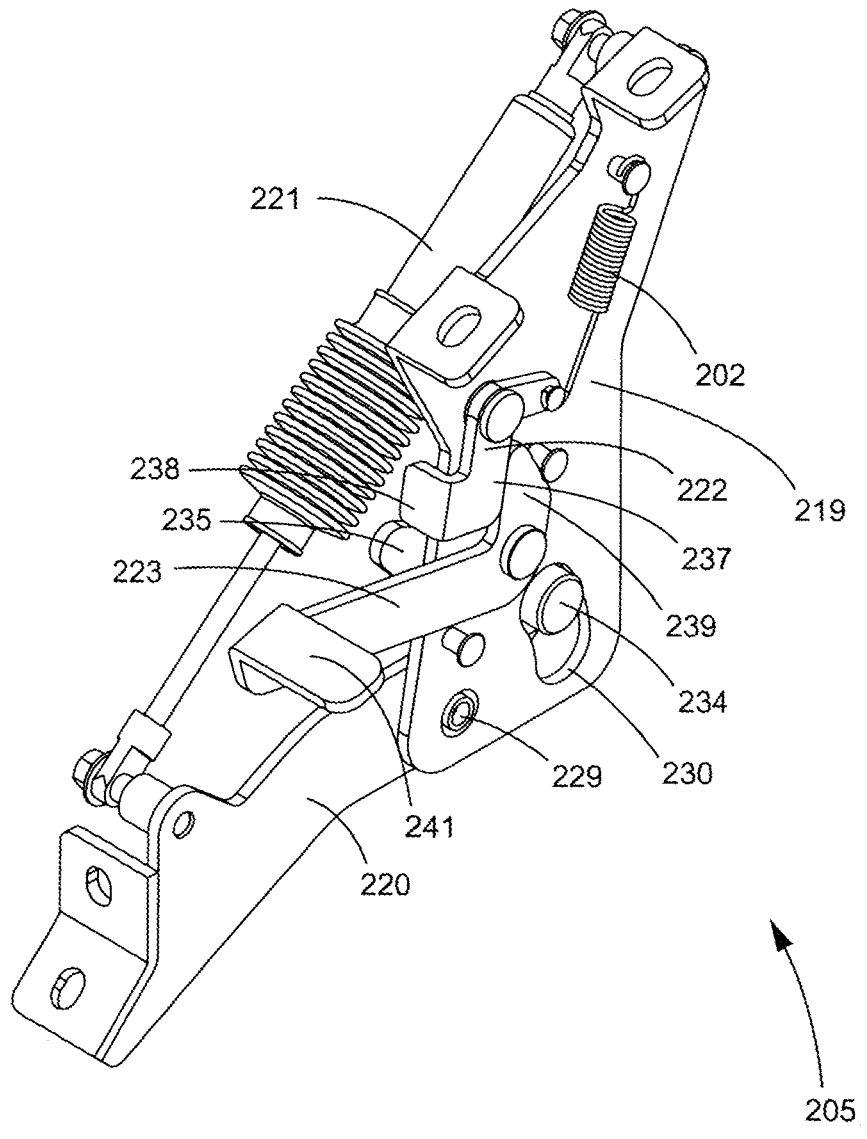
Figure 13:
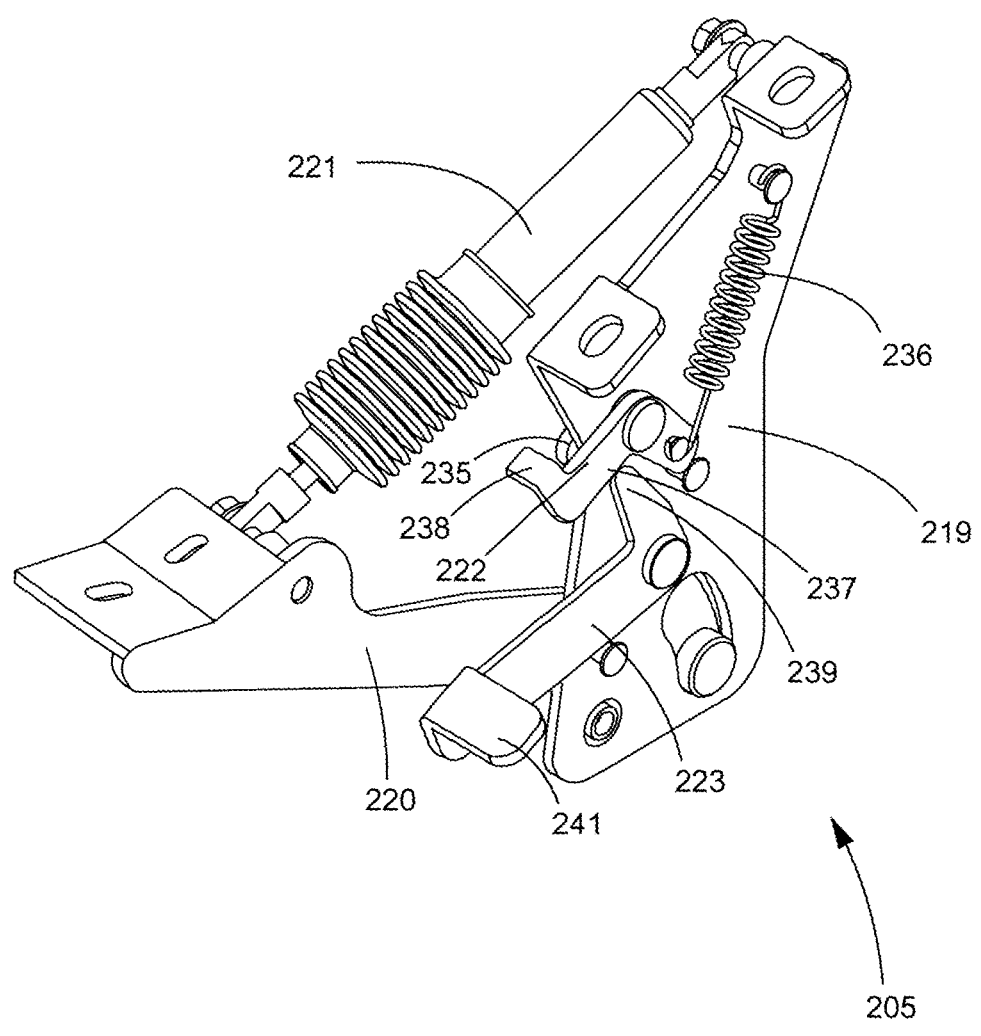

FIG. 12 and FIG. 13 shows the operational features of the fixing device 201, which has the second fixing device 205, whereby the second fixing device 205 is the fixing device which has the locking panel 222, and the locking control panel 223 to control the folding up and down of the support beam 202, whereby the support beam 202, which is fixed to support beam fixing panel 220, which is pulled by the shock absorber 221, enabling the end which is attached to the support beam 202 to be lifted up, wherein the second fixing device 205 has the locking panel 222 and the locking control panel 223, enabling the support beam fixing panel 220 to be attached and remain open and stationary, whereby the locking panel 222 has the second support part area 238 engaged to supporting part 235 of the support beam fixing panel 220, so that the support beam fixing panel 220 does not swing up according to the pulling force of the shock absorber 221, but when the support beam fixing panel 220 is required to swing up in order to lift the support beam fixing panel 220 to fit snugly to the side of the automobile 100, whereby the locking control panel 223 has one end as the supporting part 241, which was pressed down, enabling the other end of the locking control panel 223, which is the supporting part 239, to rotate and push to the first supporting part 237 of the locking panel 222, enabling the first supporting part 237 to rotate and swing and lift the second support part area 238, enabling the supporting part 235 of the support beam fixing panel 220, which is engaged so that it moves off according to the pulling of the shock absorber 221, enabling the vehicle side step 200 to be folded up at the side of the automobile 100, but when the vehicle side step 200 is needed, using pressing force on the stepping panel 203, which is attached on the support beam 202, whereby the support beam 202 moves out from the side of the automobile 100, enabling supporting part 235 of support beam fixing panel 220 to push the second support part area 238, so that it moves by having spring 236 to pull it. When the support beam 202 has moved a certain distance, the supporting part 235 of the support beam fixing panel 220, falls out of the second support part area 238, while the locking panel 222, which has one end attached to spring 236, is pulled back, enabling the locking panel 222 to return to the original position, wherein the second support part area 238 is engaged to the supporting part 235, enabling the vehicle side step 100 to remain in a secure position ready for use.

BEST MODE FOR CARRYING OUT THE INVENTION

As stated above in the detailed description of this application the passenger cabin comfortably.

The invention claimed is:
1. A vehicle side step (200) configured as a support for stepping up into an automobile (100), the vehicle side step (200) being foldable between an up position and a down position, the vehicle side step (200) being attached to a side area of the automobile (100) by a fixing device (201), the fixing device (201) comprising:

a second fixing device (205) configured to pull a support beam (202) upward to abut with the side area of the automobile (100) and to lock the support beam (202) so as to maintain the support beam (202) in an open, stationary position ready for use, the second fixing device (205) comprising:

an automobile fixing panel (219) configured to be fixed to the automobile (100), an automobile fixing panel (219) including:

a first portion having a fixing part (226) fixed to one end of the shock absorber (221);

a second portion attached to the locking panel (222), the locking panel (222) being pivotally fixed by a first rivet (227);

a locking control panel (223) positioned adjacent to the locking panel (222) and pivotally fixed to the automobile fixing panel (219) by a second rivet (228) so as to be swingable;

a third portion being attached to the support beam fixing panel (220), the support beam fixing panel (220) being pivotally fixed by a third rivet (229); and a groove (230) disposed adjacent to the third portion and engaged with one end of the support beam fixing panel (220), the groove (230) serving as a rotational restriction part that restricts rotation of the support beam fixing panel (220) to a predetermined degree;

a support beam fixing panel (220) configured to fixed to attach to the support beam (202), the support beam fixing panel (220) including:

one end fixed to the support beam (202);

a portion of a surface of the support beam fixing panel (220) having a fixing part (233) fixed to one end of the shock absorber (221), the other end abutted and pivotally attached to the automobile fixing panel (219) by the third rivet (229);

a more distal portion of said other end having a pin (234) inserted into the groove (230) of the automobile fixing panel (219); and a third supporting part (235) that supports and engages the locking panel (222);

a shock absorber (221) configured to pull and lift one end of the support beam fixing panel (220), the shock absorber (221) including:

one end being fixed to the automobile fixing panel (219); and the other end of the shock absorber (221) being attached to the support beam fixing panel (220);

a locking panel (222) configured to engage with the third supporting part (235) of the support beam fixing panel (220) and pivotally attached to the automobile fixing panel (219) by the first rivet (227), the locking panel (222) including:

one end engaged with and biased by a spring (236);

the other end having a first supporting part (237) configured to support the locking control panel (223); and a second supporting part (238) positioned further to said other end and configured to be supported by the third supporting part (235) of the support beam fixing panel (220); and a locking control panel (223) configured to be pivotally attached to the automobile fixing panel (219) by the second rivet (228), the locking control panel (223) including:

one end having a fourth supporting part (239) that is bent to support the first supporting part (237) of the locking panel (222), with a first position indicating point (240) protruding from a surface of the automobile fixing panel (219) to obstruct the fourth supporting part (239), and the other end having the fifth supporting part (241) serving as a control area for unlocking the support beam fixing panel (220), with a second position indicating point (242) configured to prevent the locking control panel (223) from swinging beyond a predetermined position.

2. The vehicle side step (200) of claim 1, wherein the fixing device (201) further comprises a first fixing device (204) configured to pull the support beam (202) up to abut with the side of the automobile (100), the first fixing device (204) comprising:

an automobile fixing panel (207) configured to attach to the automobile (100), the automobile fixing panel (207) including:

a portion with a fixing part (212) fixed to one end of the shock absorber (209);

the other portion pivotally attached to a support beam fixing panel (208) by a rivet (213); and adjacent to the rivet (213), the automobile fixing panel (207) including a groove (214) having a predetermined length and being curved along a rotational radius of the support beam fixing panel (208) to restrict rotation thereof to a predetermined angle;

the support beam fixing panel (208) configured to attached to the support beam (202), the support beam fixing panel (208) including a portion with a fixing part (217) fixed to the other end of the shock absorber (209);

one end pivotally attached to the automobile fixing panel (207) by the rivet (213); and a pin (218) disposed at an end portion of the support beam fixing panel (208) and inserted into the groove (214) of the automobile fixing panel (207) such that the pin (218) engages the groove (214) and moves longitudinally along the radius of the groove (214); and the shock absorber (209) configured to pull one end of the support beam fixing panel (208) so as to lift and rotate the support beam fixing panel (208), the shock absorber (209) including:

one end being attached to the automobile fixing panel (207); and the other end being attached to the support beam fixing panel (208).

3. The vehicle side step (200) of claim 2, wherein the fixing device (201) further comprises a third fixing device (206) configured to support a force and weight of a user applied to the support beam (202), the third fixing device (206) comprising:

an automobile fixing panel (243) configured to attach to the automobile (100), an automobile fixing panel (243) including:

a portion pivotally attach to the support beam fixing panel (244) by rivet (246); and adjacent to the rivet (246), a groove (247) having a predetermined length and being curved along a rotational radius of the support beam fixing panel (244) so as to restrict rotational to predetermined degree; and a support beam fixing panel (244) configured to attached to the support beam (202), the support beam fixing panel (244) including:

one end is configured to fixed to the support beam (202);

the other end pivotally attached to the automobile fixing panel (243) by the rivet (246);

a more distal portion of said opposite end having a pin (250) inserted into the groove (247) of the automobile fixing panel (243) such that the pin (250) engages the groove (247) and move longitudinally along the radius of the groove (247).

4. The vehicle side step (200) of claim 2, wherein the fixing device (201) is configured to fix the support beam (202) to the automobile (100), the support beam (202) being a section disposed along the length of the automobile (100) and including:

an upper portion and a front portion configured to fix to a stepping panel (203);

a concave part (251) formed in the upper portion and the front portion and configured to receive the stepping panel (203);

holes (252), at an edge of the concave part (251), configured for tightening the stepping panel (203) thereto; and a set of holes (253) in a rear region of the support beam (202) configured for tightening the support beam (202) to the fixing device (201).

5. The vehicle side step (200) of claim 2, wherein one or more stepping panels (203) are configured to be attached to the concave part (251) of the support beam (202) for supporting stepping into the automobile (100) and transmitting a pressing force to the support beam (202), the stepping panel (203) comprising:

a flat front surface including a small groove;

a back surface having holes (254) configured to be tightened to the support beam (202); and a groove (255) and a protruding part (256) on the back surface configured for insertion and fixation into the concave part (251) of the support beam (202).

6. The vehicle side step (200) of claim 1, wherein the fixing device (201) further comprises a third fixing device (206) configured to support a force and weight of a user applied to the support beam (202), the third fixing device (206) comprising:

an automobile fixing panel (243) configured to attach to the automobile (100), an automobile fixing panel (243) including:

a portion pivotally attach to the support beam fixing panel (244) by rivet (246); and adjacent to the rivet (246), a groove (247) having a predetermined length and being curved along a rotational radius of the support beam fixing panel (244) so as to restrict rotational to predetermined degree; and a support beam fixing panel (244) configured to attached to the support beam (202), the support beam fixing panel (244) including:

one end configured to fixed to the support beam (202);

the other end pivotally attached to the automobile fixing panel (243) by the rivet (246);

a more distal portion of said opposite end having a pin (250) inserted into the groove (247) of the automobile fixing panel (243) such that the pin (250) engages the groove (247) and moves longitudinally along the radius of the groove (247).

7. The vehicle side step (200) of claim 6, wherein the fixing device (201) is configured to fix the support beam (202) to the automobile (100), the support beam (202) being a section disposed along the length of the automobile (100) and including:

an upper portion and a front portion configured to fix to a stepping panel (203);

a concave part (251) formed in the upper portion and the front portion and configured to receive the stepping panel (203);

holes (252), at an edge of the concave part (251), configured for tightening the stepping panel (203) thereto; and a set of holes (253) in a rear region of the support beam (202) configured for tightening the support beam (202) to the fixing device (201).

8. The vehicle side step (200) of claim 6, wherein one or more stepping panels (203) are configured to be attached to the concave part (251) of the support beam (202) for supporting stepping into the automobile (100) and transmitting a pressing force to the support beam (202), the stepping panel (203) comprising:

a flat front surface including a small groove;

a back surface having holes (254) configured to be tightened to the support beam (202); and a groove (255) and a protruding part (256) on the back surface configured for insertion and fixation into the concave part (251) of the support beam (202).

9. The vehicle side step (200) of claim 1, wherein the fixing device (201) is configured to fix the support beam (202) to the automobile (100), the support beam (202) being a section disposed along the length of the automobile (100) and including:

an upper portion and a front portion configured to fix to a stepping panel (203);

a concave part (251) formed in the upper portion and the front portion and configured to receive the stepping panel (203);

holes (252), at an edge of the concave part (251), configured for tightening the stepping panel (203) thereto; and a set of holes (253) in a rear region of the support beam (202) configured for tightening the support beam (202) to the fixing device (201).

10. The vehicle side step (200) of claim 9, wherein one or more stepping panels (203) are configured to be attached to the concave part (251) of the support beam (202) for supporting stepping into the automobile (100) and transmitting a pressing force to the support beam (202), the stepping panel (203) comprising:

a flat front surface including a small groove;

a back surface having holes (254) configured to be tightened to the support beam (202); and a groove (255) and a protruding part (256) on the back surface configured for insertion and fixation into the concave part (251) of the support beam (202).

11. The vehicle side step (200) of claim 1, wherein one or more stepping panels (203) are configured to be attached to the concave part (251) of the support beam (202) for supporting stepping into the automobile (100) and transmitting a pressing force to the support beam (202), the stepping panel (203) comprising:

a flat front surface including a small groove;

a back surface having holes (254) configured to be tightened to the support beam (202); and a groove (255) and a protruding part (256) on the back surface configured for insertion and fixation into the concave part (251) of the support beam (202).

\* \* \* \* \*